(12) United States Patent
Harris

(10) Patent No.: US 8,882,278 B1
(45) Date of Patent: *Nov. 11, 2014

(54) PROJECTED DISPLAY

(71) Applicant: Harris Technology, LLC, Rancho Santa Fe, CA (US)

(72) Inventor: Scott C. Harris, San Diego, CA (US)

(73) Assignee: Harris Technology, LLC, Rancho Santa Fe, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/101,564

(22) Filed: Dec. 10, 2013

Related U.S. Application Data

(63) Continuation of application No. 12/581,835, filed on Oct. 19, 2009, now Pat. No. 8,602,565.

(51) Int. Cl.
  *G03B 21/26* (2006.01)
  *G09G 3/34* (2006.01)

(52) U.S. Cl.
  CPC .................................. *G09G 3/3406* (2013.01)
  USPC ................ 353/94; 353/31; 353/70; 353/79; 353/85; 353/122; 345/591; 345/593

(58) Field of Classification Search
  USPC ........... 353/30, 31, 69, 70, 71, 74, 79, 85, 94, 353/119, 122; 348/189–190, 744–745; 345/591, 593, 30, 55, 84, 87–104, 207, 345/690; 349/5, 7–9
  See application file for complete search history.

(56) References Cited

U.S. PATENT DOCUMENTS

| | | | |
|---|---|---|---|
| 6,219,011 B1 | 4/2001 | Aloni et al. | |
| 6,811,267 B1* | 11/2004 | Allen et al. | 353/122 |
| 6,879,311 B2 | 4/2005 | Sono | |
| 7,070,284 B2* | 7/2006 | Tanaka et al. | 353/84 |
| 8,130,184 B2 | 3/2012 | Garner et al. | |
| 8,373,692 B2 | 2/2013 | Uchiyama et al. | |
| 2004/0001182 A1 | 1/2004 | Dyner | |
| 2008/0172197 A1* | 7/2008 | Skipor et al. | 702/82 |
| 2009/0091623 A1* | 4/2009 | Krogstad | 348/189 |

* cited by examiner

*Primary Examiner* — Sultan Chowdhury
(74) *Attorney, Agent, or Firm* — Law Office of Scott C. Harris, Inc.

(57) ABSTRACT

A reprojection system which allows a projection to be displayed onto a display screen, and reprojected by that display screen. The display is received on the surface that itself displays, and it is then redisplayed on the surface. The redisplay can be at the same size or at a different size as the original projection. Preferably the redisplay is at the same relative intensity but a brighter actual intensity than the original display. The information is can be received and redisplayed in a number of different ways.

20 Claims, 4 Drawing Sheets

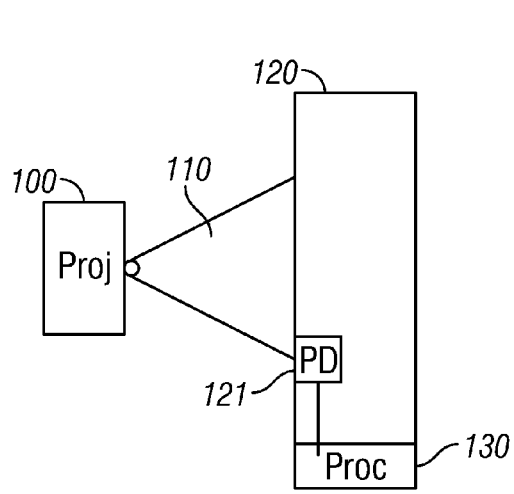
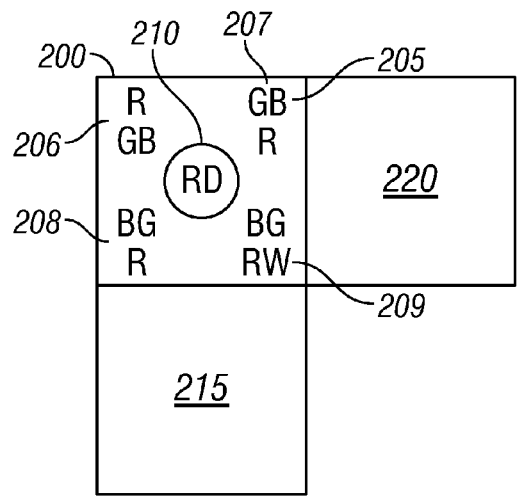
FIG. 1                FIG. 2
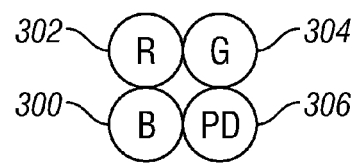
FIG. 3
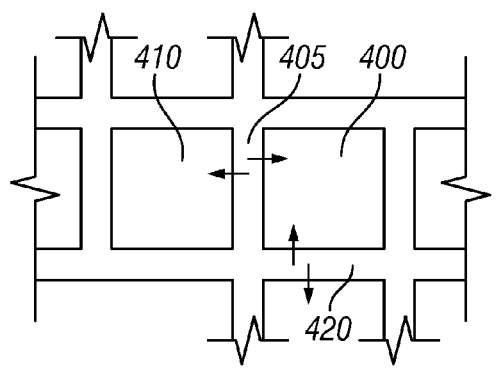
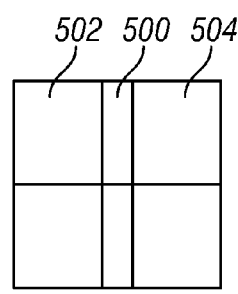
FIG. 4               FIG. 5

PROJECTED DISPLAY

CROSS-REFERENCE OF RELATED APPLICATION

This application is a continuation application of U.S. Ser. No. 12/581,835 filed Oct. 19, 2009, now U.S. Pat. No. 8,602,565 issued Dec. 10, 2013.

BACKGROUND

It is desirable to make things small. For example, cell phones, PDAs, personal music/video players and other personal devices have been miniaturized.

However, even though it is desirable to miniaturize these personal devices, this conflicts with the desire to see this media on a larger screen. Therefore, while it is desirable to have a small cell phone or Ipod, for example, it is also desirable to have a large screen TV.

SUMMARY

The present inventor recognized a trade-off and often contradiction between the personal devices and the displays for the media that can be played by the device. Users want personal devices that hold and play the media to be small. However, they want the display from such a device to be large.

An embodiment describes a redisplay device that improves a display produced by a device, e.g. by increasing the size of the display and/or by increasing the brightness of the display.

BRIEF DESCRIPTION OF THE DRAWINGS

These and other aspects will now be described in detail with reference to the accompanying drawings, wherein:

FIG. 1 shows an embodiment where a projector displays on a surface;

FIG. 2 shows pixel neighborhoods according to an embodiment;

FIG. 3 shows a specific pixel neighborhood;

FIG. 4 shows another pixel/photoreceptor layout;

FIG. 5 shows an alternative to the FIG. 4 layout;

DETAILED DESCRIPTION

Figure 6:
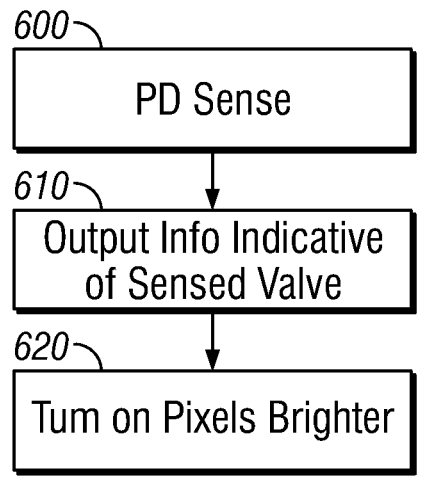
FIG. 6 shows a flowchart of pixel amplification.

The embodiments of this application refer to forming images, referred to generically as "projection". There are many devices that project images, that is, they produce a beam of light that is output to a target. Projectors are known which accept electronic input signals and produce a projection. For example, a personal device such as a phone that operates as a projector is described in my co-pending application Ser. No. 11/873,817, filed Oct. 17, 2007, and entitled "Communication Device with Advanced Characteristics".

However, the term "projection" as used herein is intended to cover not only the formation of a beam of light, but also any feature that produces light and which creates a remote display of an image. For example, this can include a spatial light modulator such as used in a projector, and can also include a self illuminating device such as LEDs or OLEDs. The term "display" may also be used to denote that an image (e.g, a still image, or a frame of a video formed of many frames or images) is formed in a viewable way.

FIG. 1 shows an embodiment where a personal projector 100 produces a projection output 110 that is transmitted to the surface of a screen 120. In this embodiment, the screen 120 is a smart projection screen, such as a television or other device that can play media (received over a channel or based on a playing of a stored file) with a projection amplification function. In the embodiment, the projector 100 may include or be driven by, for example, a personal media player such as an iPod™ with media capabilities, or a small image projector such as a miniature LED projector (which typically produces low lumen output such as 400 lm or less), a computer, the phone of the type described in my co-pending application, or any other kind of projector. It should be understood that projectors which produce lower output light levels may actually produce more advantages in this embodiment. Therefore, the projection 110 is shown in FIG. 1 may create a low light projection.

A first embodiment 200 of the smart projection screen is shown in FIG. 2. In this embodiment, there are a number of pixel neighborhoods. Each pixel neighborhood such as 205 may have a number of different pixels therein. The pixel neighborhood 205 shows different image producing pixels, which produce outputs of different primary or other additive colors. In the figures, the letter R represents a red pixel, green is represented by G, blue represented by B, white by W, and amber by A. It should be understood that other pixels and other colored pixels can be used.

In this embodiment, each pixel in neighborhood 205 includes the primary color pixels in different arrangements. For example, the first pixel group 206 has the red pixel on top of the neighborhood, green and blue on the bottom. The second pixel group 207 has green and blue on top. The green and blue on top is adjacent to the red on top in pixel group 206. Similarly, the pixel groups 208 and 209 have their pixels arranged in different ways.

The neighborhoods may be repeated across the screen. The screen 200 may be formed of other pixel neighborhoods, shown generically as 215, 220.

As conventional, the screen may have millions of pixels. By changing the order of colors in the pixel groups, noise and aliasing effects in the viewing may be reduced.

It should be understood that there can be more pixels in the neighborhoods, or in some embodiments, as described herein, there may be fewer pixels or no neighborhoods at all, where each group of pixels forms its own group.

In the FIG. 2 embodiment, each pixel neighborhood 205 is associated with a single photodetector 210.

In the embodiments, the pixels can be self emitting such as LEDs or plasma, or modulating of light sources, such as LCDs, or DMDs.

The photosensor 210 may itself be an RGB sensor, and may itself be formed up a number of different separated elements. In this embodiment, the photosensor is in the middle of a pixel neighborhood. Another embodiment may operate using one photosensor per pixel. In this embodiment, the devices forming each pixel are as shown in FIG. 3, with three displaying pixels 300, 302, 304, and a single photodetector 306.

While the embodiment shows these individual elements as being round, they can of course be any other shape, such a square or rectangular, as desired.

Another embodiment shown in FIG. 4 uses square pixels. In this embodiment, the display portion 400 is a multicolor projecting media pixel. For example, this can be a multicolor LED that can display in red, green, blue, white, and amber. This allows the color of the pixel to be set to any desired color or combination of those colors, and to be initiated to operate at a desired intensity.

In this embodiment, the display pixel 400 is surrounded by photosensing portions 405. For example, the photosensing portion 405 may be a photosensor for the two adjoining pixels 400, 410. More photosensing capability may be obtained from a lower-level photosensor 420.

Another embodiment in FIG. 5 uses one photosensor 500 in between each two adjacent display pixels 502, 504.

In an embodiment, the projection may be across an area that is less than the complete capability of the display. Forever example, using a 1080 p TV, the projection may be less than 1080; it may be 640 p, 480 p, or any other size.

In operation, in any of the previously-described or future described embodiments, the system operates as follows.

FIG. 6 shows a flowchart of this operation. At 600, the system detects the incoming light in a photodetector sensing operation. Each pixel may detect the color and intensity of the pixel. In some embodiments, this may be done in a time division multiplexed fashion, while in other embodiments, this sensing may be carried out continuously.

At 610, the output from one of the photodetectors 121 is coupled to a processor 130, which may be a digital signal processor or may be the main processor that drives content for the display screen.

At 620, the processor determines how to turn on certain pixels to values that are the same as, or proportional to, the photosensed value. For example, in an embodiment where display amplification is carried out, each pixel is determined so as to have the same color, hue, saturation and relative intensity as the received value. The pixels are caused to display at a level much brighter than the incoming radiation. The display will be at a higher actual intensity than received, but the intensity of pixels relative to other pixels will be the same.

The pixels may be redisplayed or amplified in the same place as where they are projected, in one embodiment. The pixels may be displayed in different places in other embodiments as described herein.

Figure 7:
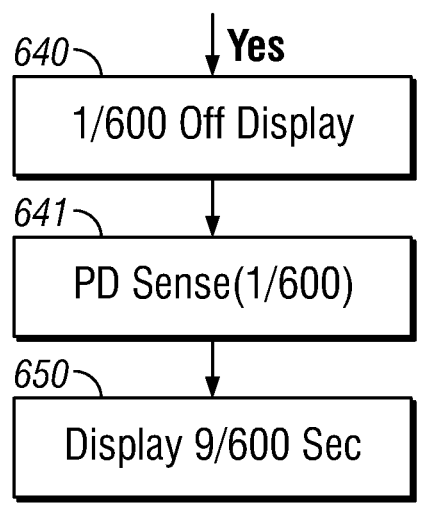
FIG. 7 shows a flowchart of multiplexing.

In one embodiment shown in the flowchart of FIG. 7, the display of the pixels may interfere with detecting the projected image. In operation, in one embodiment, the system displays its display, e.g., the amplified display, in a duty cycle, 90% of the time. For example, assuming a 60 Hz refresh cycle, during every 1/60 of a second interval, the display is turned off for 1/600 of a second at 640. During that 1/600th of a second, the photodetector sense is carried out at 641. This may be the same photodetector sense as in 600. After the photodetector sense is finished for the 1/600th of a second, the photodetector sensing is terminated, and the display occurs for the next 9/600th of a second at 650.

This allows the photodetector contents to be sensed for a short period of time as a duty cycle modulated system.

In one embodiment, the projector may wirelessly communicate with the display screen, e.g., via Bluetooth, and sync the projection time with the sensing time carried out by the display. This sync will enable the projector to display during a shorter period of time, thereby reducing its power consumption. For example, the projector can display for 1/600 second, then stop projecting for 9/600 second. This can reduce the power consumption of the projector by as much as 90%.

In embodiments, the projection may be duty cycle projected for less than ½ the overall projection time, more preferably less than 25%, or 10% or less as in the above embodiment.

Alternatively, the sync may be carried out using an optical signal produced by the TV that is sensed by the projector source. This may be an all-white display for 1/600th second produced every minute, just before one of the sensing periods. The sync will again reduce the necessary power output for the projection.

FIG. 7 shows the duty cycle modulated system.

Figure 8:
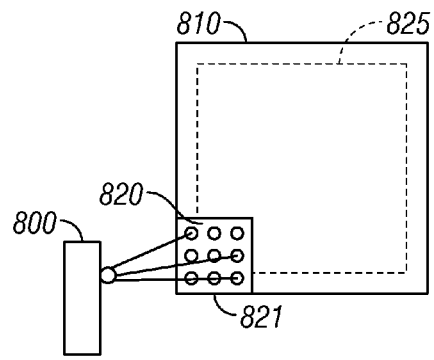
FIG. 8 shows projecting on to a portion of a screen and redisplaying on another screen portion.

FIG. 8 illustrates a screen changing embodiment. In this embodiment, the projection occurs onto only a portion of the screen, but the redisplay is carried out on a larger portion of the screen.

For example, the projection may be carried out from an area close enough to the screen that only a portion of that screen will receive the projection. In the embodiment of FIG. 8, the projector source 800 projects onto screen 810, and the projection only covers a very small portion 820 of the screen. This embodiment, the processing of FIG. 9 may be used.

Figure 9:
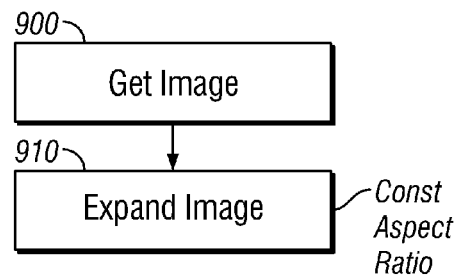
FIG. 9 shows a flowchart of expanding an image.

The flowchart of FIG. 9 shows that the image is obtained at 900. This may use any of the embodiments described herein. An electronic signal indicative of the received image is obtained from this sensing.

At 910, the image is expanded. The expansion of the image may use any conventional technique to expand an image. For example, this may use pixel filling, or pixel interpolation. This may keep the aspect ratio constant but yet expand it to the maximum size of the screen, or to the maximum usable resolution detected within the projection.

In another embodiment this may stretch the image at least partly. For example, the image processing may stretch the edges of the image only, while keeping the content the same, or may stretch areas in the image which will not distort features in the image. This may use certain techniques as described in my co-pending application Ser. No. 11/126,492, filed Jan. 10, 2005.

This embodiment enables, therefore, shows projecting to a smaller screen portion such as 820, and then expanding and redisplaying that on a larger screen portion such as 825.

Figure 10:
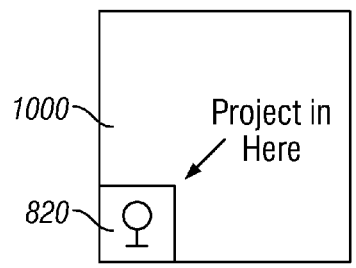
FIGS. 10-12 show separate photodetector and display portions on the screen.

According to the embodiment of FIG. 8, the TV in projection mode may display a perimeter line such as 1000 in FIG. 10. This line 1002 forms a perimeter around the area in which a projection will be received. In this embodiment of FIG. 8, the area 820 includes photodetectors therein, shown as 821 in FIG. 8. While FIG. 8 shows only nine photodetectors, there are preferably many more. This may use any of the pixel embodiments from the previous embodiments.

In this embodiment, there are photodetector pixels in the area 820. The rest of the screen other than the area 820 forms the area 825. The rest of the area 825 does not require photodetectors in the pixels. This may facilitate forming this system, since only a portion of the screen requires photodetectors.

Figure 11:
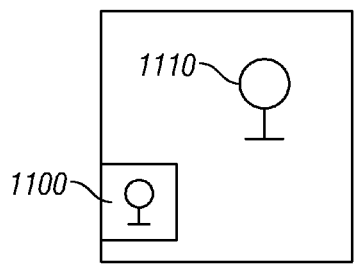

The line 1002 indicates an area within which the photodetector pixels are located. It may also display instructions such as "project in here" as shown in the FIG. 10 drawing. A projection into this area 820 may then be converted to a projection to the entire screen. Once detecting a projection in the area 820, the system may continue for example to carry out a redisplay operation. In this embodiment, for example FIG. 11, therefore, a projection in the small area shown as 1100 is translated to a projection over the entire area shown as 1110.

Figure 12:
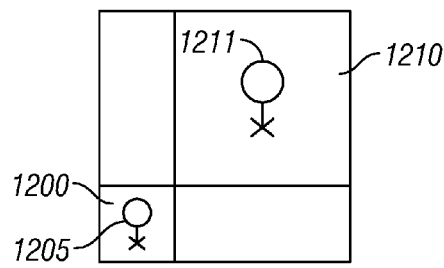

An alternative embodiment shown in FIG. 12 may avoid the time division operation of FIG. 7, and its possibility of being perceived as being flickering, by devoting a small area of the screen 1200 to being solely a receiver on that area. Therefore, the small area 1200 receives an image such as 1205, and other areas of the screen 1210 then re-project that image as 1211. In this embodiment, there is no need to turn off the projection at intervals. Also in this embodiment, some parts of the display screen do not require photosensors.

Figure 13:
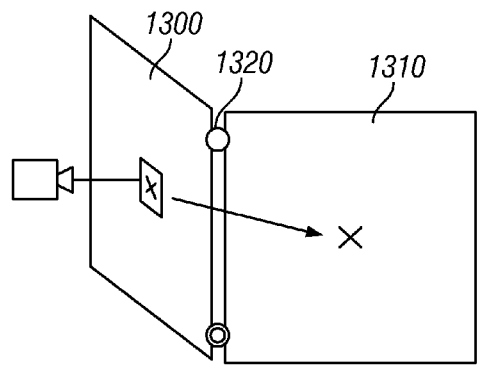
FIG. 13 shows a separate photodetector portion.

Another embodiment, shown in FIG. 13 may use a foldout portion 1300 that is attached to the main screen 1310. This foldout portion can be hinged on a hinge 1320, or can be pulled out in any other way. While FIG. 13 shows this as being the same height as the screen, the foldout portion can be much smaller than the screen. In this embodiment, a projection may be made on the foldout portion, and that projection is then translated to display on the main portion. Again, this may avoid the need for time division multiplexing, and its attendant possibility of flickering.

Figure 14:
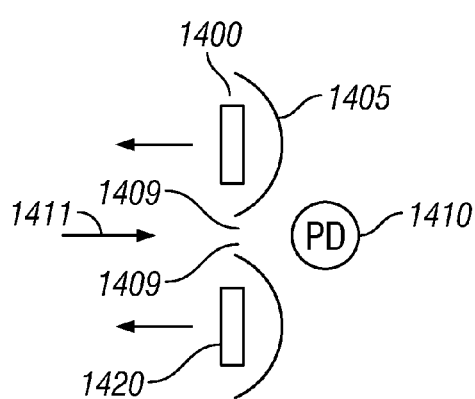
FIG. 14 shows an embodiment with light shields.

Another embodiment which may avoid the flicker as shown in FIG. 14. In this embodiment, each pixel has a project portion such as 1400, and a light shield 1405. A photodetector 1410 is located in the shadow 1409 between multiple projection pixels 1400, 1420. The pixels 1400, 1420 both project light, but the light which is projected is shaded/shielded so that it is not received by the photodetector 1410. The photodetector 1410 therefore senses incoming light such as 1411 which passes into the shadow area 1409.

Figure 15:
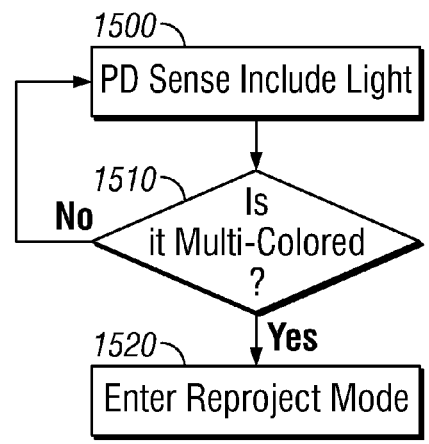
FIG. 15 shows a flowchart of automatic redisplay sensing.

In this embodiment, the processor may operate according to FIG. 15. At 1500, the photodetector 1410 senses whether there is incoming light. If so, 1510 then determines if the incoming light is multiple colored. The reason for detecting this is to determine whether this is a spotlight or flashlight, or other item which would not typically indicate that the information or the redisplay should be carried out. If not, flow returns to 1500. However, if a multiple colored light is detected, then the re-projection mode is entered at 1520. This then automatically enters re-projection mode, by detecting a projection on the screen. Moreover, this system may be used with any of the other embodiments, for example where only a portion of the screen has photoreceptors.

Figure 16:
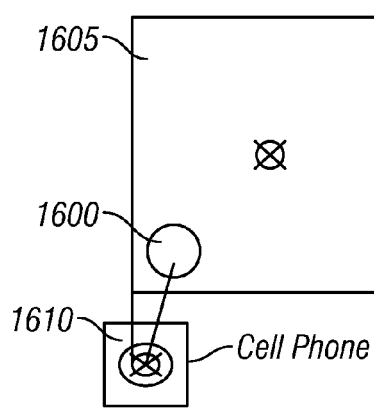
FIG. 16 shows projecting from a cell phone.
Figure 17:
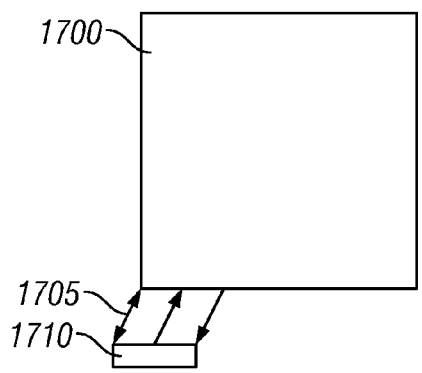
FIG. 17 shows an embodiment where a projector is coupled to a display.

FIG. 16 shows an embodiment where there is a small lens camera 1600 on the display screen 1605. This small lens camera can sense for example, the display of the cell phone shown as 1610 or of an iPod. Therefore, an image shown upon the cell phone display may be re-projected onto the TV. Another embodiment, shown in FIG. 17, forms a main display 1700 with a slide out tray 1705. The slide out tray 1705 has a cradle portion 1710 at its end. The cradle portion 1710 can hold a cell phone or personal media device, and can electrically connect back device to the TV.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the "projection" is intended to include display of information from the computer on any other display device, including a monitor, LED device, television, or any other device. The content may be an image of any type, a photo, a presentation, a video, or any other kind of display.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of displaying an image, comprising: receiving, in a first display device, first optical information in the form of a displayed image that is displayed on a second display device; said displayed image that is received being of a first size, in said first display device, detecting color and intensity of said displayed image of each of a plurality of pixels of said displayed image; and displaying a second image on a display screen associated with said first display device, said second image being based on said displayed image, where each of said plurality of pixels of said second image have been changed to be brighter than the pixels of the displayed image, but each of the plurality of pixels of the second image have the same relative intensity relative to one another as pixels of the displayed image.

2. The method as in claim 1, wherein said displayed image and said second image change over time to form a video.

3. The method as in claim 1, wherein each of the plurality of pixels have the same relative color, hue, and saturation in both the displayed image and in the second image.

4. The method as in claim 1, wherein said second image is larger in size than said displayed image.

5. The method as in claim 1, wherein said displayed image is sensed optically, on the same surface that displays said second image.

6. The method as in claim 4, further comprising, in said first display device, using electronic interpolation to change information indicative of the displayed image to a larger size to display as said second image.

7. The method as in claim 1, wherein said displayed image is received by photosensors in said first display device.

8. A display device, comprising:
an optical receiver, that receives first optical information in the form of a displayed image that is displayed on a second display device, by optically sensing said image, said displayed image that is received being of a first size, an image driver, detecting color and intensity of said displayed image of each of a plurality of pixels of said displayed image; and
an optical display, displaying a second image on a display screen, said second image being based on said displayed image, where each of said plurality of pixels of said second image have been changed to be brighter than the pixels of the displayed image, but each of the plurality of pixels of the second image have the same relative intensity relative to one another as pixels of the displayed image.

9. The device as in claim 8, wherein said displayed image and said second image change over time to form a video.

10. The device as in claim 8, wherein said optical receiver uses using photo sensors for receiving said displayed image.

11. The device as in claim 10, wherein said displayed image is received on the same surface that displays said second image.

12. The device as in claim 8, wherein each of the plurality of pixels have the same relative color, hue, and saturation in both the displayed image and in the second image.

13. The device as in claim 8, wherein said second image is larger in size than said displayed image.

14. The device as in claim 8, wherein said image driver uses electronic interpolation to change information indicative of the displayed image to a larger size to display as said second image.

15. The device as in claim 8, wherein said display device is a portable electronic device having the optical display and having a cradle for holding the second display device in a location to receive said displayed image from said second display device.

16. A display device, comprising:
a cradle having surfaces for holding a portable optical device;
an optical receiver, with photosensors that receive light indicative of a displayed image that is displayed on the portable optical device;
an image driver, detecting color and intensity of said displayed image of each of a plurality of pixels of said displayed image; and
an optical display, displaying a second image on a display screen of said display device that is separate from said portable optical device, said second image being based on said displayed image.

17. The device as in claim 16, where each of said plurality of pixels of said second image have been changed to be brighter than the pixels of the displayed image, but each of the plurality of pixels of the second image have the same relative intensity relative to one another as those of the displayed image.

18. The device as in claim 16, wherein said displayed image and said second image change over time to form a video.

19. The device as in claim 16, wherein said displayed image is received on the same surface that displays said second image.

20. The device as in claim 16, wherein said second image is larger in size than said displayed image, and wherein each of the plurality of pixels have the same relative color, hue, and saturation in both the displayed image and in the second image.

* * * * *